(12) United States Patent
Mohammed et al.

(10) Patent No.: US 8,713,183 B2
(45) Date of Patent: Apr. 29, 2014

(54) RESOURCE COMPATABILITY FOR DATA CENTERS

(75) Inventors: Sakhavullah Mohammed, Hyderabad Andhra Pradesh (IN); Reddy Challa Narsimha, Hyderabad Andhra Pradesh (IN); Raju Kalidindi, Hyderabad Andhra Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 166 days.

(21) Appl. No.: 13/072,723

(22) Filed: Mar. 27, 2011

(65) Prior Publication Data

US 2012/0246318 A1     Sep. 27, 2012

(51) Int. Cl.
*G06F 15/173*     (2006.01)

(52) U.S. Cl.
USPC ........... 709/226; 709/238; 709/239; 370/254; 370/351

(58) Field of Classification Search
USPC ........................................................ 709/226
See application file for complete search history.

(56) References Cited

U.S. PATENT DOCUMENTS

| | | | |
|---|---|---|---|
| 6,014,715 A * | 1/2000 | Stoevhase ....................... | 710/11 |
| 6,279,039 B1 * | 8/2001 | Bhat et al. ...................... | 709/226 |
| 6,882,630 B1 * | 4/2005 | Seaman .......................... | 370/256 |
| 7,343,399 B2 * | 3/2008 | Hayball et al. ................. | 709/219 |
| 7,743,127 B2 | 6/2010 | Santos et al. | |
| 7,809,817 B2 * | 10/2010 | Hillier ............................ | 709/223 |
| 8,122,109 B2 * | 2/2012 | Ciano et al. .................... | 709/220 |
| 8,244,562 B2 * | 8/2012 | Jain et al. ....................... | 705/7.11 |
| 8,255,513 B2 * | 8/2012 | Assa ............................... | 709/224 |
| 8,359,374 B2 * | 1/2013 | Govil et al. .................... | 709/220 |
| 8,370,473 B2 * | 2/2013 | Glikson et al. ................. | 709/223 |
| 2002/0089934 A1 * | 7/2002 | Sokhin et al. .................. | 370/237 |
| 2002/0116234 A1 * | 8/2002 | Nagasawa ........................ | 705/5 |
| 2003/0169694 A1 * | 9/2003 | Seaman .......................... | 370/254 |
| 2005/0050350 A1 * | 3/2005 | Cain ............................... | 713/201 |
| 2006/0256733 A1 * | 11/2006 | Bejerano ........................ | 370/254 |
| 2006/0291447 A1 * | 12/2006 | Siliquini et al. ............... | 370/352 |
| 2007/0209034 A1 | 9/2007 | Doganata et al. | |
| 2008/0168424 A1 * | 7/2008 | Mohindra et al. ............. | 717/120 |
| 2008/0263187 A1 * | 10/2008 | Casey et al. .................... | 709/223 |
| 2010/0106812 A1 | 4/2010 | Bernabeu-Auban et al. | |
| 2010/0161793 A1 * | 6/2010 | Young Hwan et al. ........ | 709/224 |
| 2010/0228836 A1 * | 9/2010 | Lehtovirta et al. ............ | 709/220 |
| 2010/0250747 A1 * | 9/2010 | Karaoguz et al. .............. | 709/226 |
| 2011/0060832 A1 * | 3/2011 | Govil et al. .................... | 709/225 |
| 2011/0161468 A1 * | 6/2011 | Tuckey et al. .................. | 709/220 |
| 2011/0167145 A1 * | 7/2011 | Bush et al. ..................... | 709/223 |
| 2011/0225312 A1 * | 9/2011 | Liu et al. ........................ | 709/231 |
| 2011/0302295 A1 * | 12/2011 | Westerfeld et al. ............ | 709/224 |

(Continued)

OTHER PUBLICATIONS

Pastravanu et al., "Rule-Based Controller Design Algorithm for Discrete Even Manufacturing Systems", Jun. 1994, American Control Conference, vol. 1, p. 299-305.*

(Continued)

*Primary Examiner* — Ali Abyaneh
*Assistant Examiner* — Demaris Brown

(57) ABSTRACT

Systems and methods of resource compatibility for data centers are disclosed. In an example, the method may include accessing a condition for utilizing resources. The method may also include comparing the condition to compatibility information for the resources in a data center. The method may also include using the comparison to identify a supported configuration for the resources in the data center satisfying the condition.

18 Claims, 5 Drawing Sheets

(56) References Cited

U.S. PATENT DOCUMENTS

| | | | |
|---|---|---|---|
| 2012/0106358 A1* | 5/2012 | Mishra et al. | 370/242 |
| 2012/0123898 A1* | 5/2012 | Kirkeby et al. | 705/26.7 |
| 2012/0231829 A1* | 9/2012 | Guo | 455/509 |

OTHER PUBLICATIONS

Zhao et al., "ELHFR: A Graph Routing in Industrial Wireless Mesh Network", Jun. 2009, IEEE, p. 106-110.*

Huang et al., "Uniform Resource Name Resolution Based on VIRGO P2P Network", Oct. 2009, Global Mobile Congress, p. 1-5.*

Diamos et al., "Harmony: An Execution Model and Runtime for Heterogeneous Many Core Systems", Jun. 2008, ACM, p. 197-200.*

William Arnold; Tamar Eilam; Michael Kalantar; Alexander V. Konstantinout; Alexander A. Totok; Pattern Based SOA Deployment; http://www.cs.nyu.edu/~totok/professional/papers/pattern-soa-deployment.pdf; Publication Date: 2007; On pp. 1-12.

Tamar Eilam; Michael Kalantar; Alexander Konstantinou; Giovanni Pacifici; Model-based Automation of Service Deployment in a Constrained Environment; http://citeseerx.ist.psu.edu/viewdoc/download?doi=10.1.1.84.5741&rep=rep1&type=pdf; Publication Date: Sep. 8, 2004.

* cited by examiner

Fig. 4

| Parameter | A | B | C | D |
|---|---|---|---|---|
| Multipath | X |   | X |   |
| High Data Availability | X | X |   | X |
| Replications Supported | X | X | X |   |
| Storage Capacity | X | X | X |   |
| Number Systems Access | X | X |   | X |
| Storage Capacity Available | X | X |   | X |
| Reliability | X |   | X |   |

RESOURCE COMPATABILITY FOR DATA CENTERS

BACKGROUND

Data centers have been around since the early days of computing, when the typical computer system required the physical space of an entire room. As computers became smaller and less expensive, the personal computer became more prevalent. However, with advances in the availability and speed of computer networks, data centers have become more commonplace, particularly for large enterprises. Modem data centers (also referred to as "cloud computing") offer a consolidated environment for providing, maintaining, and upgrading hardware and software for an enterprise, in addition to more convenient remote access and collaboration by many users.

Modern data centers also provide more efficient delivery of computing services. For example, it is common for the processor and data storage for a typical desktop computer to sit idle over 90% of the time during use. This is because the most commonly used applications (e.g., word processing, spreadsheets, and Internet browsers) do not require many resources. By consolidating processing and data storage in a data center, the same processor can be used to provide services to multiple users at the same time.

Large data centers (e.g., those serving a large enterprise or even the users of many different organizations) can include many different types and versions of hardware, operating systems, software, and other resources. Diversity in computing resources even within the same data center may be the result of large data centers serving multiple customers each having different requirements. This diversity may also be the result of large data centers being expanded, and components of the data center being upgraded at different times. In any event, it is often difficult to keep track of the resources available in any given data center.

BRIEF DESCRIPTION OF THE DRAWINGS

FIG. 4 illustrates an example tabular set diagram which may be used to check conditions and provide resource compatibility for data centers.

DETAILED DESCRIPTION

Figure 1:
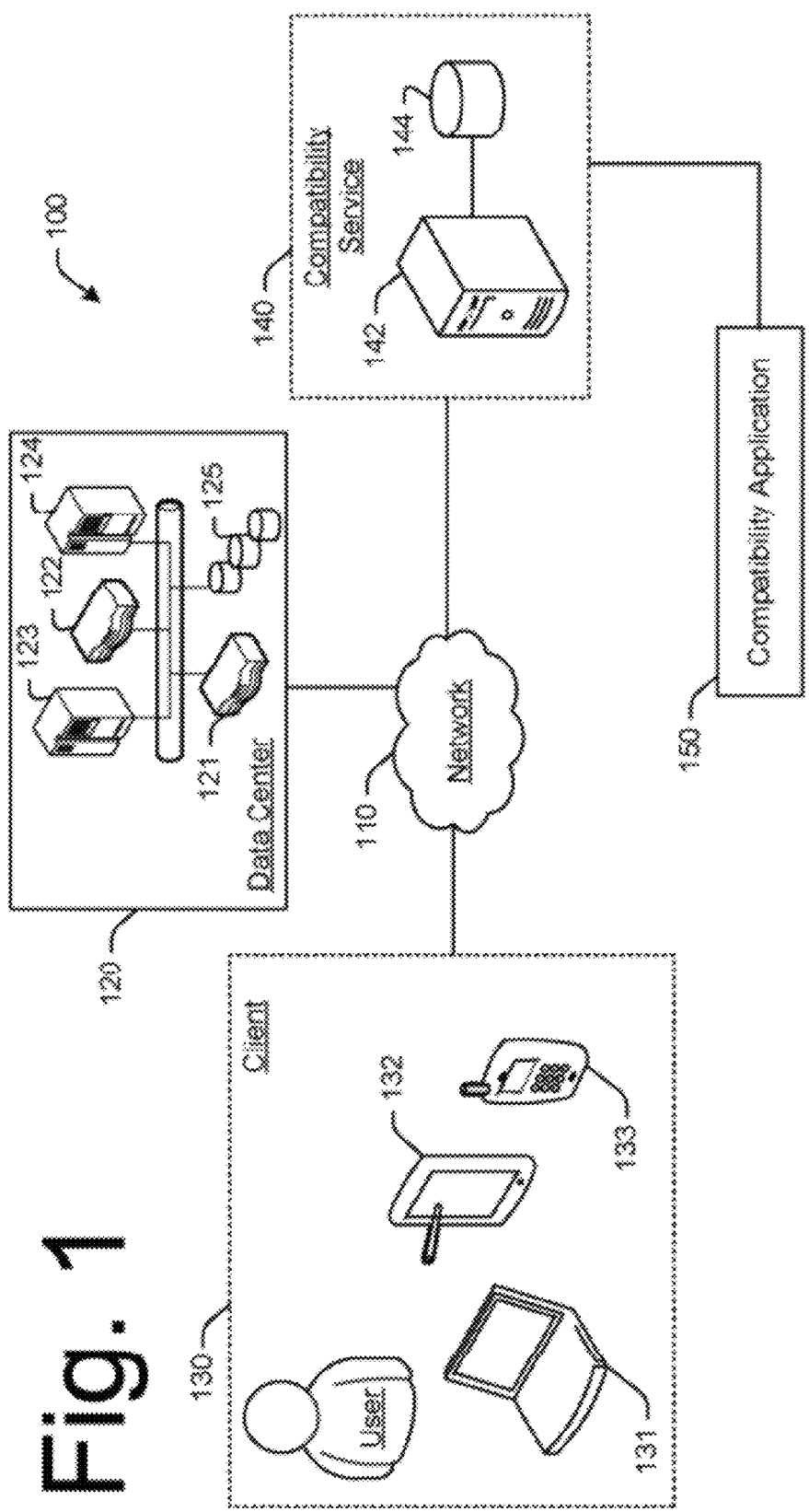
FIG. 1 is a high-level illustration of an exemplary networked computer system which may implement resource compatibility for data centers.

Systems and methods are disclosed which provide resource compatibility for data centers (also referred to as "cloud computing" or "cloud" environments). By way of illustration, a particular configuration of data center resources may be desired to deploy and execute a database application. A condition for installing and executing the database may be that the data center include a host capable of multi-pathing, and a storage subsystem having a capacity in the range of 200 to 500 GB. That is, installing the application will take about 200 GB of storage capacity, and then as the database is used, up to about 500 GB of additional storage will be needed as records are added. In large data centers it may be difficult to manually identify a suitable host and storage subsystem, along with the appropriate hardware and software platforms for the intended use scenario. Previous deployments have relied on manually intensive trial and error approaches.

The systems and methods described herein may be used to identify compatible resources in a data center based on a condition. A condition may include more than one parameter. In the example above, the condition includes both host and storage parameters for deploying the database application. The systems and methods may be automated using a compatibility matrix to identify resources that satisfy the condition. In an example, multiple supported configurations may be identified for a particular condition. A supported configuration is a configuration of resource(s) which satisfies the condition, at least in part. A supported configuration may include a listing of resources and interoperability of the resources that are available in the data center which satisfy the condition, at least in part. The supported configurations may be presented to a user for manual selection, automatically selected, or selected using a combination of both automatic and manual selection techniques. In an example, the resources satisfying the condition may be automatically configured according to a preferred configuration of the resources.

As such, suitable resources may be readily identified from a large variety of available resources in a data center. If no resources satisfy the condition, a recommendation may be made for changing resources or configuration of resources so that the resources satisfy the condition. For example, incompatibility issues between various hardware devices and the firmware and driver versions may be identified, which when addressed may satisfy the condition.

In addition, the systems and methods disclosed herein may be used for auditing resources in the data center. For example, incompatibility issues may be resolved by making hardware, firmware, and/or software upgrades to the existing resources, without having to add resources to the data center. The systems and methods may also be used to extend a support matrix for existing data center configurations. For example, incompatibility issues may be issued directly to a support center for scheduling upgrades and reconfigurations at the data center. These and other uses will be better understood with reference to the figures and corresponding discussion.

FIG. 1 is a high-level illustration of an exemplary networked computer system 100 which may implement resource compatibility for data centers. The networked computer system 100 may include one or more communication networks 110, such as a local area network (LAN) and/or wide area network (WAN), providing access to a data center 120.

Data center 120 may be housed at a single facility, or distributed across multiple facilities, for access by users at different locations having access via the network 110. Regardless of the physical location of the data center 120, communications in data centers are typically network-based. The most common communications protocol is the Internet protocol (IP), however, other network communications may also be used. The data center 120 may be connected by routers 121 and switches 122 and/or other network communications devices that move network traffic between the servers 123, 124, storage devices 125, and/or other resources in the data center 120. The network devices may also make connections with the network 110 to provide external access to the resources of the data center 120.

Some of the resources in the data center 120 are used for basic communications services (both with internal and external entities), such as email servers, proxy services, etc. Both on-site and off-site security and monitoring resources may also be deployed as part of the data center 120. The data center 120 may also include physical security and environmental (e.g., cooling) components.

The main purpose of the data center 120 is providing client(s) 130 access to the resources, including but not limited to data processing resources, data storage, and/or application handling. Providing the client(s) 130 access to the resources in the data center 120 may also include provisioning of the resources, e.g., via file servers, application servers, and the associated middleware.

The terms "client" and "clients" 130 as used herein refer to a computing device through which user(s) may access the data center 120. Client computing devices 131-133 may include any of a wide variety of computing systems, such as a stand-alone personal desktop or laptop computer (PC), workstation, personal digital assistant (PDA), or appliance, to name only a few examples. Each of the client computing devices 131-133 may include memory, storage, and a degree of data processing capability at least sufficient to manage a connection to the network 110 either directly or indirectly. Client computing devices may connect to network 110 via any suitable network communication protocol, such as via an Internet service provider (ISP).

The user(s) may include anybody (or any entity) who desires access to resource(s) in the data center 101. The user(s) may also include anybody who desires access to a compatibility service 140. The compatibility service 140 is described in more detail below, but for now it is sufficient to understand that the compatibility service 140 may be implemented to identify resource compatibility in the data center 120.

In one example, the user may be the same person (or entity) that accesses resources in the data center 120 as a client 130, and also accesses the compatibility service 140. In another example, the users who access the data center 120 may be different than the users who access the compatibility service 140. For purposes of illustration, a user may be a network administrator. The network administrator in charge of deploying a database application for a human resources department of an enterprise may access the compatibility service 140 to identify suitable resources in the data center 120. In another example, the user may be an engineer at an enterprise. The engineer may access the compatibility service 140 to reserve processing and data storage resources in the data center 120, and then that same engineer may access the reserved resources in the data center 120 for a large-scale data analysis project.

The compatibility service 140 may be implemented in the networked computer system 100 via any suitable computing system, including for example, a server 142 with computer-readable storage 144. The compatibility service 140 may execute a compatibility application 150 implemented in machine readable instructions (e.g., software or other program code).

In an example use case, user(s) may desire access to the data center 120 for a particular purpose. The purpose may be long term, such as installing and executing a database application, or backing up data for an enterprise. The purpose may also be short term, such as a large-scale computation for a one-time data analysis project. Regardless of the purpose, the user(s) may specify a condition for carrying out the purpose. The condition may specify a single parameter, or multiple parameters for using resources in the data center 120.

The compatibility service 140 may receive the condition for utilizing resources in the data center 120. For example, the condition may describe the storage resources needed to install and execute a database application. In another example, the condition may include more than one parameter (e.g., both storage and execution resources).

The compatibility service 140 executes the compatibility application 150 to compare the condition with compatibility information for the resources in the data center 120. For example, the compatibility information may include an inventory of resources in the data center 120. The inventory may include information about the resources, such as, versions, use allocations, interoperability, etc. The compatibility service 140 determines if there is a supported configuration of the resources in the data center 120 which satisfies the condition. A supported configuration is a configuration of resource(s) which satisfies the condition at least in part. For example, the compatibility service 140 may identify a storage resource 125 having sufficient available capacity as part of the supported configuration which satisfies the condition.

Any level of granularity may be implemented. For example, the compatibility service 140 may identify storage devices that are available. In another example, the compatibility service 140 may identify the storage devices and all middleware for accessing the storage devices. The compatibility service 140 may take into consideration factors such as availability, and in addition, specific characteristics of the resources such as, firmware versions, drivers, logical and physical connections, and projected downtime, to name only a few of many examples.

As such, the systems and methods described herein may be used to simplify the deployment of applications in data centers and other "cloud" environments, to audit resources in data centers, to identify changes to resources and/or the configuration of resources in data centers, and to provide both preferred and alternative configurations which satisfy a condition specified by a user.

Figure 2:
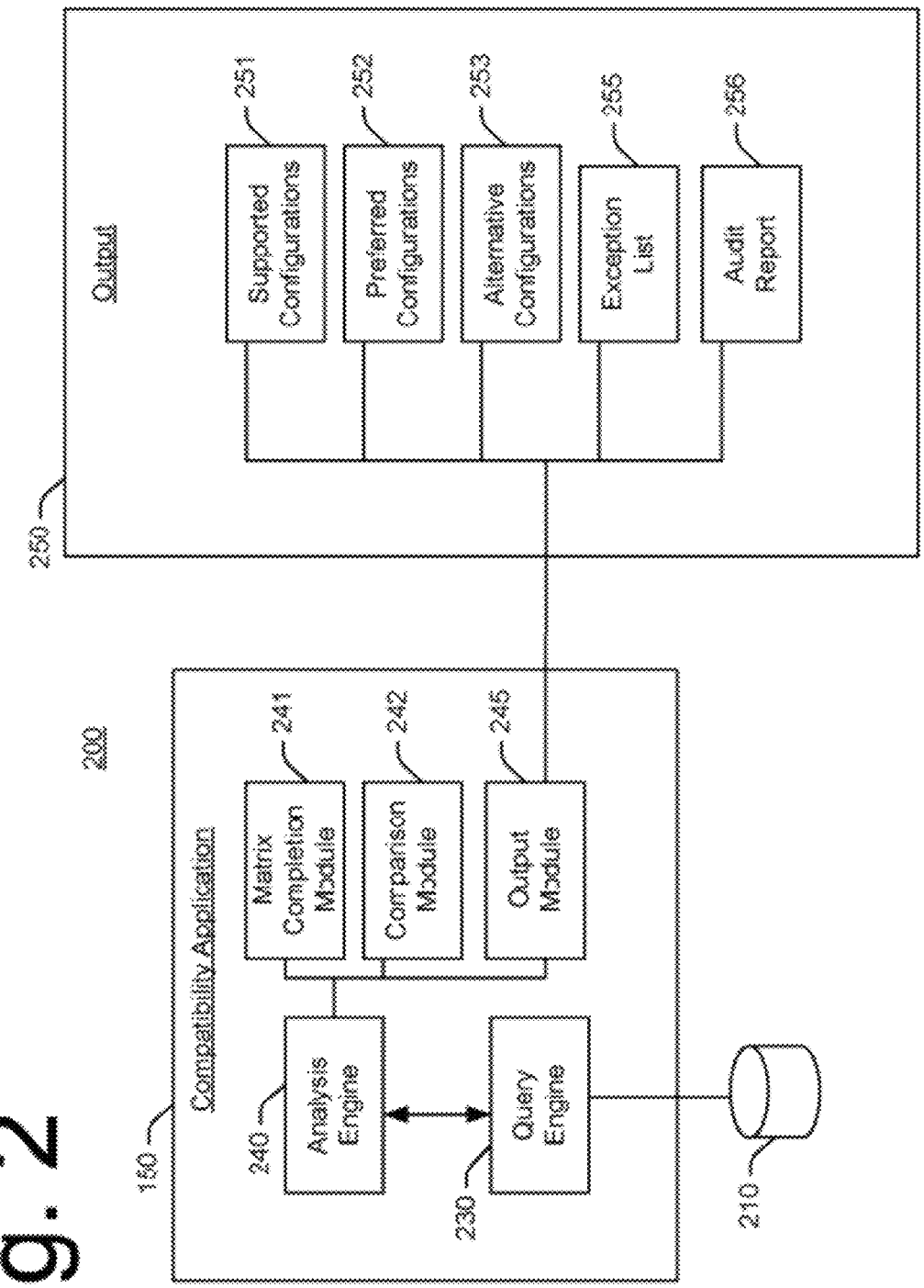
FIG. 2 shows an example architecture of machine readable instructions which may be executed to provide resource compatibility for data centers.

FIG. 2 shows an example architecture 200 of machine readable instructions which may be executed to provide resource compatibility for data centers. The machine readable instructions (such as but not limited to, software or firmware) may be stored on a computer readable medium and executable by one or more processor to perform the operations described herein. In an example, the machine readable instructions may be embodied as the compatibility application 150 shown in FIG. 1. It is noted, however, that the components shown in FIG. 1 are provided only for purposes of illustration of an example operating environment, and are not intended to limit execution to any particular computing system.

The compatibility application 150 may perform the function of the architecture of machine readable instructions as self-contained modules. These modules can be integrated within a self-standing tool, or may be implemented as agents that run on top of an existing database. In an example, the compatibility application 150 may perform operations on at least one database 210 (or other data structure) to generate output 250. The database 210 may be provided on the same or different computer readable medium where the compatibility application 150 resides.

During operation, an analysis engine 240 receives a condition from a user requesting compatibility information about resources in a data center. The analysis engine 240 is operatively associated with a query engine 230 The query engine may access information about resources in the data center from database 210.

In an example, existing data about the resources in the data center are used to populate a matrix. A matrix completion module 241 may be used to populate the matrix with this information. For purposes of illustration, information related to storage resources may include the type and number of storage devices in the data center, storage capacity, access speed, availability, among other characteristics. Information may also be provided about the other resources used to provide access to the storage resources. For example, other information may include, but is not limited to information about disk management entities, operating systems, application software, hardware drivers, and firmware. Existing data from the manufacturer, commercial databases, published literature, or internal systems/subsystems may be used.

The analysis engine may also access a comparison module 242. The comparison module 242 may be used in conjunction with the matrix to identify relevant characteristics of the resources in the data center. These characteristics may be relevant to at least one of the parameters of the condition. The characteristics may also include identifying information, such as, part name and part number.

The comparison module 242 may also compare the condition against information in the matrix (e.g., using comparison techniques and related algorithms). In an example, the comparison module 242 uses a tree structure and traverses nodes in the trees to compare the condition against information in the matrix. After suitable resources have been identified in the data center which satisfy the condition, an output module 245 may construct output 250.

In an example, output 250 may identify a plurality of supported configurations 251 of the resources in the data center which satisfy the condition. The output 250 may identify may also identify preferred configuration(s) 252, and/or alternative configuration(s) 253.

In another example, output 250 may identify may include an exception list 255. The exception list 255 may identify an incompatibility with the resources in the data center. As such, the exception list 255 may be used to identify change(s) that may be implemented to the resources in the data center which would enable the resources to satisfy the condition. For example, updating a firmware version or a device driver may enable the resources to be used for the desired purpose.

In another example, output 250 may include an audit report 256. The audit report 256 may be used to automatically audit resources in the data center. For example, the audit report 256 may identify incompatibilities which are not necessarily related to the condition specified by the user, but which were found by the compatibility application 150 and should be addressed. For example, the compatibility application may be executed independently of a condition to audit interoperability of resources in the data center.

It is noted that the functional modules are shown in FIG. 2 simply for purposes of illustration, and are not intended to be limiting in any manner. Still other functions and functional modules may also be provided. In addition, the functions and functional modules may be combined with one another or used independently of one another.

Figure 3:
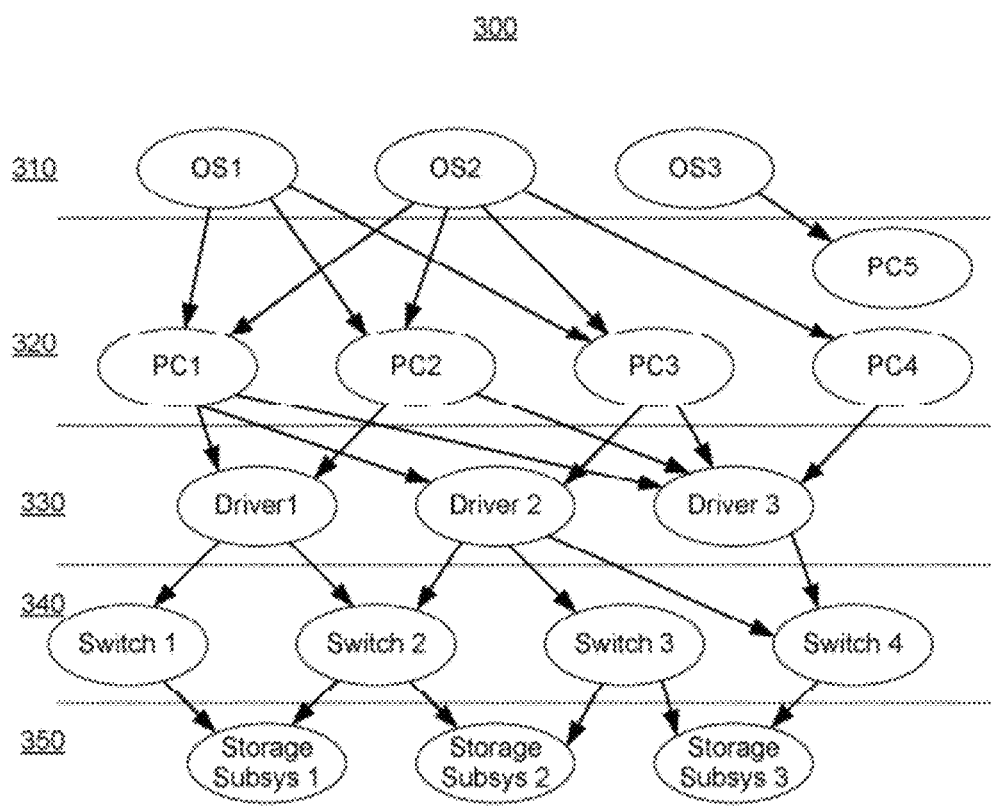
FIG. 3 illustrates resource compatibility for a storage subsystem example.

FIG. 3 illustrates resource compatibility for a storage subsystem example. In this example, the storage subsystem is a storage area network (SAN) in a data center. The topology of the SAN can be represented as a graph 300. The graph 300 may be expressed by the function G(V,E), where V is a set of Vertices and E is a set of Edges.

During operation, the compatibility application 150 retrieves all supported configurations for tiers or levels of resources in the data center that may be used to support the desired storage subsystem specified by the condition. A supported configuration is a configuration of resource(s) which satisfies the condition, at least in part. A supported configuration may include a listing of resources and interoperability of the resources that are available in the data center which satisfy the condition, at least in part. In this example, configurations are included for an operating system level 310, a computing hardware platform 320, a driver level 330, a switch/firmware level 340, and a storage subsystem level 350. After generating a list of supported platforms, a set of patterns is generated including parameters for the following objects:
{{Server Info, HBAInfo}, Switch Info, Storage subsystem Info}

The number of objects in a set may vary depending upon storage tier architecture. Supported configurations patterns in an example may include:
{OS=RHEL5.*, Server Hardware=Hp Integrity series, Emulex HBA 5.4 Driver version, Brocade model 4*, Firmware version=5.2, EVA 3000}
{Win2k3, Hp Integrity series, Emulex HBA 5.4 Driver version, Brocade Model 4*, Firmware version=5.2, EVA 3000}
{RHEL5 Hp Integrity series, Emulex HBA 5.4 Driver version, Brocade Model 4* Firmware version>=5.2, EVA4k}

Each Supported Configuration may be modified with more parameters that the user has included in the condition. For example, parameters may include dual port HBA, replication supported storage systems, etc. From the available list of supported configurations, suitable matching configurations are identified in the data center given the current configuration(s). Next, any conflicts are analyzed and changes proposed to make the partially supported configuration into a preferred configuration.

With reference to the example shown in FIG. 3, suppose the OS1 host is connected to Switch 2 having a firmware version 4.2. If the firmware version of Switch 2 is upgraded to version 5.2, then Switch 2 is compatible with the Driver 1.

Here the supported configuration pattern set is matched with the possible paths from a server to storage system level and compared with the respective object information for the properties of the respective vertex V. The path in which one pattern is completely matched is considered to be a preferred path. Preferred paths are sorted again, and compared to the set of parameters that was given by the condition.

Some of the paths may need changes to make the path a preferred path. Those paths are considered as partially compatible paths. Both the preferred paths and partially compatible paths may be sorted considering other requirements and factors.

Some factors that may be considered include satisfying the number of multipaths from server to storage subsystem, or multipath at the fabric level; high data availability storage subsystem raid configuration, replication supported storage subsystem, maximum number of external storage devices that can be utilized in the SAN, and the number of storage systems the server can access.

The following pseudo code is an example of an algorithm which may be used:

```
CompatibleServer(G(V,E),List Servers, List Compatible Configurations)
    For Each Managed Server
        Generate all possible paths starting from Managed Server to connected to
```

```
        Storage System
        Store these Paths in to a Hash Map with Managed Server key -> List of paths
        that are available from that server to various Storage Arrays.
    End For
    For each pattern in Support configuration Pattern
        //token sets will be there {Server Info including HBA Objects, Switch Info,
        Storage System Objects}
            For each Managed Server keys in Hash Map
                Check if the Server Object is matches with Managed Server
            Info
                CompareAndGetPaths(List of Paths, pattern) Add the paths to
            list
        End For //Managed Server
    End For // Pattern
    CompareAndGetPaths(List of Paths,pattern )
        For each Spanning tree in List {G(V,E)}
        //Compare the possible Supported Pattern with the all the paths
        //Each node in the given path has to be compared with the respective pattern
        token properties. Server vertex Properties has to be compared with Server
        Token properties. Compare Switch and Storage System properties.
            If all the properties of vertex are matched then add the path Path List.
        {Multipathing and Replication can also be considered while matching the
        pattern}
            Otherwise
            Check if basic Information is matched Model Vendor everything and Driver
            Firmware version is not matched then add the path to PartiallyCompatiblePath
            list.
            //Paths in which {Service packs mismatches, Driver mismatches, Firmware
            Mismatches and Port speed mismatches} can be added to
            PartiallyCompatiblePath list.
        End For
End
```

Once all the paths are generated, the path which best meets the condition can be selected by the user, or in another example, automatically or semi-automatically using the following pseudo code:

```
Analyzer
For each Path
    //All these factors will be analyzed and they will be sorted
    depending up on the priority of the factors they satisfied.
    //Multipaths, High DataAvailability are highly priority parameters.
    1. Multipath,
    2. High data availability,
    3. Replications supported storage system,
    4. Amount storage space that is required,
    5. Number of Storage Systems it can access,
    6. Amount of Storage it can use,
    7. List of Compatible Softwares it can use
        a. MPIO Softwares
        b. LVM Softwares
        c. Back Up Softwares
End For
End
```

The following pseudo code then gives the list of paths in which conflicts to be resolved:

```
PartiallyCompatibleAnalyzer (List <PartiallyCompatiblePaths>)
For each Path is PartiallyCompatiblePaths
//It will display the conflicts that need to be resolved to make it as ideal
path.
    For Ex:WINXP Sp2 is supported for Oracle 11g presently
    WinXP is on the host.
    End For
End For
End
```

The parameters are shown above being analyzed using both the preferred paths and the conflicts paths to identify a preferred server. The algorithm then provides a sorted list of preferred servers with a list of corresponding, prioritized parameters that are satisfied.

The lists may be used to determine whether the server is a SAN attached host. From the compatible patterns, only two levels need to be traversed: the platform level and the server level. The set of configurations that are supported are retrieved. After the list of sets is generated, then the lists are checked to determine if any one of the supported sets is available in the list.

The above example algorithm may be used to find the possible number of paths from the managed servers to the storage subsystem having vertices V with properties identified in the supported configuration patterns. The possible number of paths gives the set of configurations that are available.

Sometimes it may happen that there isn't a single possible path. In this case, the conflicts may be identified to determine if any changes would make the path a supported configuration path. The set of paths and corresponding list of changes that can be applied to make a supported configuration may be generated.

The algorithm may also check for high data availability and reliability. Suppose that out of five possible paths, replication and redundant paths are not available in the supported configurations. Then the algorithm provides the list of changes that need to be made to the five possible paths, and also checks for the list of changes that can be made to other paths which include replication supported storage systems and redundant paths. The algorithm traverses the existing configuration and maintains the information of redundant paths and replication supported storage systems. Using these paths, the algorithm checks for any conflicts that need to be resolved to make the path a supported configuration.

FIG. 4 illustrates an example tabular set diagram 400 which may be used to check conditions and provide resource compatibility for data centers. Continuing with the example described above for FIG. 3, the conditions are specified for a storage subsystem.

In this example, column 401 includes a number of parameters or conditions which may be specified by the user. Row 402 identifies configurations A-D which satisfy at least some of the conditions. The intersection of condition and configuration indicates whether a condition is satisfied. An "X" indicates that the condition is satisfied, while an "empty box" indicates that the condition is not satisfied. It is noted that any suitable data structure may be used for the analysis, and the tabular set diagram 400 is shown merely as an illustration. The tabular set diagram 400 is not intended to be limiting in any manner.

In FIG. 4, it can be seen that configuration A satisfies all of the conditions. Accordingly, in an example configuration A may be presented to the user at the optimal or ideal configuration for deployment. Also in this example, Configuration B satisfies many, but not all, of the conditions. In an example, configuration B may be presented to the user as an alternative configuration. Configurations C-D do not satisfy as many conditions. In an example, additional information may be presented to the user for configurations C-D with proposed changes (e.g., upgrading a firmware version), which if implemented, may enable configurations C-D to satisfy the conditions.

Before continuing, it is noted that the components depicted in the figures corresponding to the systems described above are merely exemplary of various configurations which may be implemented for resource compatibility for data centers. However, the systems described herein are not limited to any specific components or configuration of those components. Still other embodiments are also contemplated, as will be readily understood by those having ordinary skill in the art after becoming familiar with the teachings herein.

Figure 5:
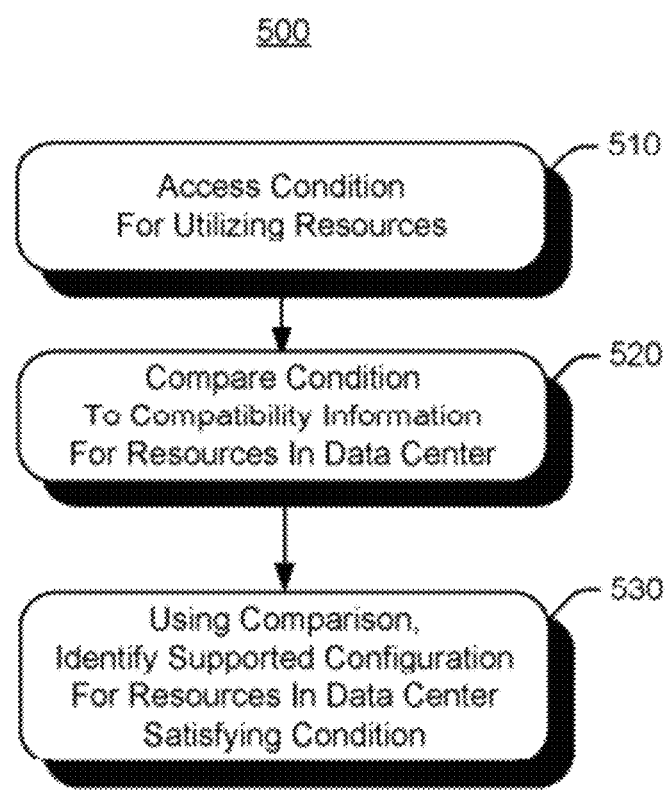
FIG. 5 is a flowchart illustrating exemplary operations which may be implemented to provide resource compatibility for data centers.

FIG. 5 is a flowchart illustrating exemplary operations which may be implemented for resource compatibility for data centers. Operations 500 may be embodied as logic instructions on one or more computer-readable medium. The computer readable medium is inclusive of system memory (e.g., memory on which the program is installed as well as portable or remote memory that stores installation files for the program). Thus program code includes both the installed application and the installation files. When executed on a processor, the logic instructions cause a general purpose computing device to be programmed as a special-purpose machine that implements the described operations. In an exemplary implementation, the components and connections depicted in the figures may be used for brokering creative content online.

In operation 510, a condition is accessed for utilizing resources. The term "accessing" means actively getting/retrieving and/or passively receiving. For example, the condition may describe the storage resources to install and execute a database application. It is noted that the condition may include more than one parameter (e.g., storage and execution resources).

In operation 520, the condition is compared to compatibility information for the resources in a data center. For example, the compatibility information may include the capacity and current use of storage resources in the data center.

In operation 530, the comparison is used to identify a supported configuration for the resources in the data center satisfying the condition. For example, a storage resource with sufficient capacity that is not currently in use (or reserved for another use) may be identified as part of the supported configuration satisfying the condition.

In an example, identifying comprises generating an output that identifies the supported configuration. Generating an output means one or more of creating an electronic file, producing a hardcopy, and causing a display on an electronic device.

The operations shown and described herein are provided to illustrate exemplary implementations. It is noted that the operations are not limited to the ordering shown. Still other operations may also be implemented.

For purposes of illustration, operations may include identifying a plurality of configurations supported by the resources in the data center satisfying the condition. Operations may also include identifying a preferred configuration supported by the resources in the data center satisfying the condition. Operations may also include identifying an alternative configuration supported by the resources in the data center satisfying the condition.

In another example, operations may include generating an exception list. The exception list may identify an incompatibility with the resources in the data center. The exception list may identify a change to the resources in the data center for satisfying the condition.

In another example, operations may include automatically auditing resources in the data center. Operations may also include recommending updates to the resources in the data center based on the auditing.

It is noted that the exemplary embodiments shown and described are provided for purposes of illustration and are not intended to be limiting. Still other embodiments are also contemplated for implementing resource compatibility for data centers.

The invention claimed is:

1. A method of resource compatibility for data centers, comprising by a computing device:
   accessing, by a computing device, a condition for utilizing resources, a topology of the resources represented as a graph (G) expressed by a function G(V,E), where V is a set of vertices and E is a set of edges, the condition including at least one parameter for deploying resources;
   comparing, by the computing device, the condition to compatibility information for the resources in a data center;
   using the comparison and the graph G to identify a supported configuration for the resources in the data center satisfying the condition, the supported configuration presented from an available list of supported configurations, as part of a sorted list of preferred resources and as corresponding prioritized parameters satisfied by the preferred resources, wherein a preferred configuration is the supported configuration that matches a set of parameters given by the condition; and
   identifying a change to be made to the resources in the data center to satisfy the condition, the change including updating a firmware version or device driver for at least one of the resources so that an updated resource satisfies the condition and is usable for a desired purpose and configuring the resources according to the preferred configuration of the resources by at least resolving at least one conflict in a current configuration of the data center to support the preferred configuration.

2. The method of claim 1, wherein identifying comprises generating an output that identifies the supported configuration.

3. The method of claim 1, further comprising identifying an alternative configuration supported by the resources in the data center satisfying the condition, wherein both the preferred paths and conflicts paths are analyzed to identify the preferred resources and the alternative configuration.

4. The method of claim 1, further comprising generating an exception list.

5. The method of claim 4, wherein the exception list identifies an incompatibility with the resources in the data center.

6. The method of claim 4, wherein the exception list identifies a change to the resources in the data center for satisfying the condition, the change including updating a firmware version or device driver for at least one of the resources so that an updated resource is usable for a desired purpose.

7. The method of claim 1, further comprising automatically auditing resources in the data center and generating an audit report, the audit report identifying incompatibilities unrelated to the condition for utilizing the resources.

8. The method of claim 7, further comprising recommending updates to the resources in the data center based on the auditing.

9. A non-transitory computer readable medium having program code stored thereon, the program code executable by a processor for:
   accessing an inventory of resources in a data center, a topology of the resources represented as a graph (G) expressed by a function G(V,E), where V is a set of vertices and E is a set of edges;
   comparing a condition to compatibility information for the resources in the inventory, the condition including at least one parameter for deploying resources; and
   based on the comparison and the graph G, identifying a supported configuration in a subset of the resources in the inventory, the supported configuration satisfying the condition and presented from an available list of supported configurations, as part of a sorted list of preferred resources and corresponding prioritized parameters satisfied by the preferred resources, wherein a preferred configuration is the supported configuration that matches a set of parameters given by the condition; and
   identifying a change to be made to the resources in the data center to satisfy the condition, the change including updating a firmware version or device driver for at least one of the resources so that an updated resource satisfies the condition and is usable for a desired purpose and configuring the resources according to the preferred configuration of the resources by at least resolving at least one conflict in a current configuration of the data center to support the preferred configuration.

10. The program code of claim 9 further identifying a plurality of configurations supported by the resources in the data center satisfying the condition.

11. The program code of claim 9 further identifying an alternative configuration supported by the resources in the data center satisfying the condition, wherein both the preferred paths and conflicts paths are analyzed to identify the preferred resources and the alternative configuration.

12. The program code of claim 9 thither identifying an incompatibility with the resources in the data center.

13. The program code of claim 9 further auditing resources in the data center and generating an audit report, the audit report identifying incompatibilities unrelated to the condition for utilizing the resources but which should still be addressed.

14. The program code of claim 13 further recommending updates to the resources in the data center.

15. A system of determining resource compatibility for a data center, the system comprising:
   a memory;
   a query module executed by a computing device to access an inventory of resources in the data center, a topology of the resources represented as a graph (G) expressed by a function G(V,E), where V is a set of vertices and E is a set of edges;
   a comparison module executed by a computing device to determine compatibility of the resources in the inventory with a condition based at least in part on the graph G, the condition including at least one parameter for deploying resources; and
   an output module executed by a computing device to identify for a user a supported configuration for the resources in the data center satisfying the condition, the supported configuration presented from an available list of supported configurations, as part of a sorted list of preferred resources and corresponding prioritized parameters satisfied by the preferred resources, wherein a preferred configuration is the supported configuration that matches a set of parameters given by the condition; and
   wherein the output module identifies a change to be made to the resources in the data center to satisfy the condition, the change including updating a firmware version or device driver for at least one of the resources so that an updated resource satisfies the condition and is usable for a desired purpose, and configuring the resources according to the preferred configuration of the resources by at least resolving at least one conflict in a current configuration of the data center to support the preferred configuration;
   wherein the query module, comparison module, and output module are stored on the memory.

16. The system of claim 15, further comprising an analysis module executed by a computing device to identify a plurality of configurations supported by the resources in the data center satisfying the condition, the plurality of configurations including a preferred configuration supported by the resources in the data center satisfying the condition, and an alternative configuration supported by the resources in the data center satisfying the condition, the preferred configuration and the alternative configuration based on at least resolving conflicts in resource paths, and wherein both the preferred paths and conflicts paths are analyzed to identify the preferred resources and the alternative configuration.

17. The system of claim 15, wherein the output module further generates an exception list identifying an incompatibility with the resources in the data center, and a change to the resources in the data center for satisfying the condition, the change based on an audit report identifying incompatibilities unrelated to the condition for utilizing the resources.

18. The method of claim 1, wherein the comparison is based on matching a supported configuration pattern set with possible configurations and compared with respective object information for properties of a respective vertex V in the graph G.

* * * * *

UNITED STATES PATENT AND TRADEMARK OFFICE
CERTIFICATE OF CORRECTION

PATENT NO.       : 8,713,183 B2                                              Page 1 of 1
APPLICATION NO.  : 13/072723
DATED            : April 29, 2014
INVENTOR(S)      : Mohammed et al.

It is certified that error appears in the above-identified patent and that said Letters Patent is hereby corrected as shown below:

In the Claims

Column 11, line 53, Claim 12, delete "thither" and insert -- further --, therefor.

Signed and Sealed this
Seventeenth Day of February, 2015

Michelle K. Lee
*Deputy Director of the United States Patent and Trademark Office*